Dec. 31, 1963  P. E. YOST  3,116,037
BALLOON BODY STRUCTURE FOR TOWED BALLOON
Filed Dec. 27, 1961
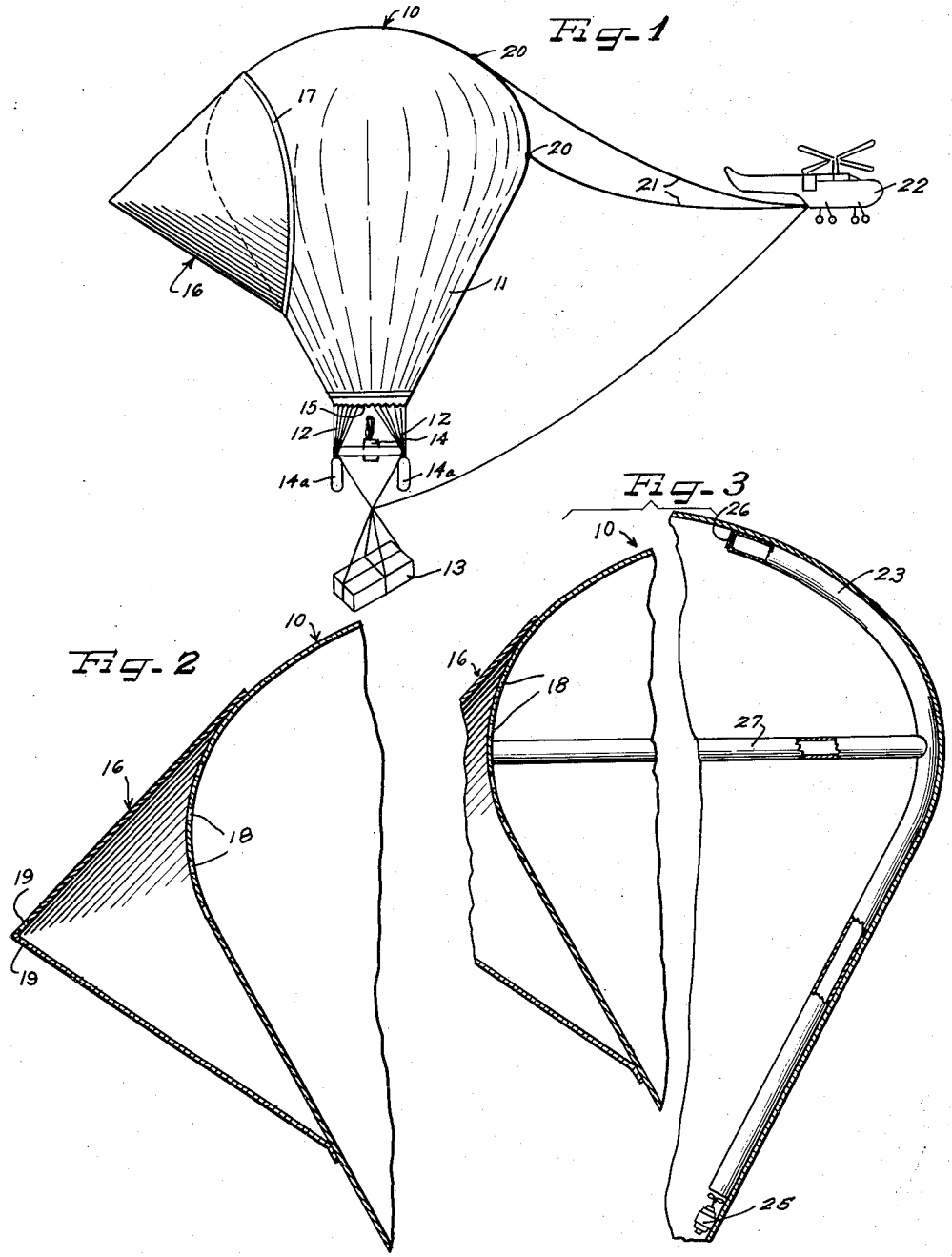
INVENTOR.
Paul E. Yost
BY
ATTORNEYS

United States Patent Office 3,116,037
Patented Dec. 31, 1963

3,116,037
BALLOON BODY STRUCTURE FOR TOWED
BALLOON
Paul E. Yost, Sioux Falls, S. Dak., assignor to Raven
Industries, Inc., Sioux Falls, S. Dak., a corporation of
South Dakota
Filed Dec. 27, 1961, Ser. No. 162,458
5 Claims. (Cl. 244—31)

The present invention relates to improvements in balloons particularly to an improved balloon construction well suited for lifting heavy loads to be towed from one location to another.

Developments in hot air filled balloons have made possible the practical use of balloons for lifting and transporting heavy loads. The practical use of balloons for this purpose has heretofore been unobtainable because of the high cost of lifting gas when helium or hydrogen were used and because of the lengthy inflation time and the expense of providing balloon envelopes which were not reusable. The provision of laminated lightweight fabrics have made envelopes reusable and inflation with hot air has reduced the cost of use to a degree where balloons can be practically used for transporting heavy loads over terrain where ground vehicles cannot be used. The heavy loads are limted by the balloons and are towed laterally such as by helicopters attached to the balloon and load. To maintain the expense of such balloons within a practical range they must be made by conventional methods such as by forming the balloons in a generally teardrop shape with a cylindrical or round upper portion and a tapered or conical lower portion, and the balloons are conveniently made in the "natural shape" as is known to those versed in the art. These shapes are readily obtainable by various manufacturing methods such as by forming strips of balloon material into shaped gores and attaching the gores to each other at their edges by sewn or otherwise sealed seams. The size of a balloon necessary to raise a heavy weight creates a large area with considerable wind resistance and drag for towing. Drag is largely created by eddy air currents which form behind a balloon being towed. This wind resistance or drag can be reduced considerably by providing a shaped balloon vehicle which is tapered in the direction of flight, but this has heretofore unreasonably increased the cost of manufacture. For example in a 30,000 cubic foot balloon or regular shape the horizontal drag at a velocity of 10 miles per hour is 120.45 pounds whereas in a "blimp-shaped" or in other words a horizontal streamlined balloon shape, the balloon can move a velocity of 30 miles per hour with a drag of only 91.4 pounds. To further emphasize the advantage of streamlining, in a 6 million cubic foot balloon, a teardrop shaped balloon would create a drag of 50,372 pounds at 25 miles per hour requiring a theoretical horsepower of 3,361 to pull it. A blimp-shaped balloon of the same size could be pulled at twice the speed; 50 miles per hour with a drag of 6,181.2 pounds requiring only 824 horsepower. It will thus be seen that streamlining is of the essence in practical horizontal movement of balloon supported heavy loads.

An object of the present invention is to provide an improved balloon structure suitable for being towed laterally while supporting a heavy load which offers the advantages of streamlining but which can be constructed more simply and at a far more reasonable cost than that required to construct a conventional blimp-shaped balloon.

A further object of the invention is to provide an improved balloon structure which embodies a conventional teardrop shaped balloon but which obtains a lateral teardrop shape with accompanying large reduction in lateral air resistance.

A still further object of the invention is to provide an improved balloon structure employing a conventional balloon shape but obtaining far greater strength against collapse and deformation due to the air resistance forces against the balloon as it is being towed.

A general overall object of the invention is to provide an improved balloon construction suited for "work-horse" operation in repeated continual transporting of heavy loads such as over ground areas of uneven terrain or over water areas.

Other objects, advantages and features will become more apparent with the teaching of the principles of the invention in connection with the disclosure of the preferred embodiments thereof in the specification, claims and drawings, in which:

FIGURE 1 is a somewhat schematic side elevational view of a balloon structure constructed in accordance with the principles of the present invention, shown in flight;

FIGURE 2 is a schematic vertical sectional view of a portion of the balloon structure; and FIGURE 3 is a fragmentary view shown with parts broken away of a portion of the balloon structure.

As shown on the drawings:

In FIGURE 1 the balloon structure illustrated includes a balloon body section 10 which has a conventional teardrop shape with a round or cylindrical upper portion and a tapered conical lower portion, and the balloon may have the "natural shape" known to the art. The balloon body is conveniently formed of gores 11 attached to each other at their side edges by seams formed by stitching or other suitable means. The balloon material is lightweight and wear scuff resistant such as by being formed of an outer layer of woven nylon and an inner layer of thin lightweight plastic such as Mylar. The outer surface is scuff resistant and provides the tensile strength necessary while the inner surface makes the balloon body impervious to the leakage of air. However since the balloon is inflated by heated gas which is continually supplied, leakage openings will not noticeably adversely affect the balloon performance.

At the lower end of the balloon load lines or tapes 12 are suitably secured to the balloon material and extend downwardly to meet at a point and to be attached to a load 13.

The lower end of the balloon has an inflation opening 15 and a burner 14 is supported at a central location below the opening. The heater or burner 14 may be of various suitable types of burning fuel such as propane supplied in containers 14a with the flow of fuel to the burner controlled by a suitable valve which is regulated to maintain a desired free lift in the balloon 10 for carrying the load 13 at a substantially uniform altitude.

The balloon body 10 has a conventional shape and is substantially symmetrical about its vertical axis. For streamlining the shape in a lateral direction and reducing the eddy currents which occur and provide a substantial portion of the resistance to horizontal towing, an inflatable tapering conically shaped tail section 16 is attached to the side of the balloon. The tail section may be formed of the same material as the balloon and formed in gores or in other suitable patterns and attached along its circular base to the wall of the balloon along a seam 17. The attachment may be provided by sewing or otherwise sealing or taping to the balloon body 10.

For maintaining the tail section 16 inflated, passage means in the form of gas flow openings 18 are provided in the wall of the balloon body 10, FIGURE 2. To insure a continuous flow of the heated air into the tail section 16 escape openings 19 are provided. While some lift may be afforded by the tail section 16, the primary purpose of the flow of gas into the section is to maintain it inflated and maintain its wall in a noncollapsed condition.

To avoid collapse of the front side of the balloon body 10, spaced connection locations 20 are provided on the balloon wall for the attachment of two lines 21 leading to a towing helicopter 22. The tow lines are of such a predetermined length that they hold the balloon side wall rounded and prevent it from collapsing, and the connection locations 20 may be provided by rings or tie cords taped or otherwise sealed to the balloon material, with the balloon material reinforced by patches around the connecting locations.

FIGURE 3 particularly illustrates an arrangement for reinforcing the balloon walls and particularly the wall on the leading side of the balloon structure. A plurality of tubular beams are extended along the wall as illustrated by the beam 23. While a plurality of beams may be employed, only one is illustrated for clarity. These have been omitted from the showing of FIGURE 2 for simplicity of illustration. These are conveniently formed of a tubular plastic material and the tubes are pressurized for strength. The upper end of the beam 23 is closed and is provided with a pressure escape valve 26 which may be inexpensively formed of a rubber flap type of valve, and a pressurizing means such as a fan 25 is provided at the lower end of the beam 23. The fan may be energized by batteries carried by the balloon. The beam will thus remain in tubular form and will provide considerable reinforcing strength preventing the collapse of the balloon wall with its resistance to air as it is towed. Additional strength may be afforded by horizontally extending beams 27 which extend diametrically through the balloon to be anchored to the opposite side. These beams are illustrated by the horizontal beam 27, and also may be pressurized such as by being connected to the vertical beams 23.

In operation the balloon is inflated with heating lifting gas to inflate the body portion 10 and the tail section 16. The load 16 is attached and the burner 14 provides adequate free lift to take the load aloft. A towing helicopter 22 is attached to the load lines 20 which tow the balloon horizontally and maintain its leading wall rounded against collapse with the tail section preventing the action of eddy currents and the resultant drag effect. When the load reaches a landing location the burner 14 is reduced or turned off to land the load, and control of the burner may be provided by automatic means or from the plane and cut-off can be accomplished from the plane at the landing location.

Thus it will be seen that there has been provided a balloon structure which takes advantages of conventional balloon manufacturing techniques and to provide a balloon body of standard shape and with simple modification the structure obtains a streamline balloon shape which will not collapse while being towed and which will greatly reduce the towing force required and will permit towing at increased speeds.

It will be recognized from the foregoing that while a balloon is shown with various features aiding in improved tow capabilities, the features may be used together or individually.

The burner 14 will incorporate a control means such as a valve operable to control the lift of the balloon such as for maintaining the balloon in level flight, or for maintaining a constant relationship between the portion of the load lifted by the balloon and the portion lifted by the helicopter.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A balloon structure comprising an inflatable balloon body, an inflation opening provided in the body for inflating the body with a heated lifting gas, a heater carried on the balloon body for supplying heated lifting gas to the balloon through the inflation opening during flight, a trailing section secured at one side of said body and projecting laterally therefrom for improving the air resistance characteristic of the structure in a lateral direction, passage means opening from said body to said trailing section for inflating the section with heated lifting gas, and a leakage opening in said trailing section for insuring the flow of gas into the trailing section from said body.

2. A balloon structure comprising in combination an inflatable balloon body having a wall of a general teardrop shape symmetrical about a vertical axis, a plurality of load lines evenly circumferentially distributed extending downwardly below the body to a load for providing uniform support forces thereto, an inflation opening provided in the body for inflating the body with a lifting gas, a heater for supplying a flow of lifting gas to the balloon body through said inflation opening during flight, a laterally extending inflatable tapering section secured along its base to one side of said body, and a gas leakage passage substantially smaller than said base opening from said body through said wall into said tapering section for inflating the section with a lifting gas with said passage having substantially no effect on the shape of the balloon body so that uniform lift will be provided by said body.

3. A balloon structure comprising in combination an inflatable balloon body having a wall of a general teardrop shape symmetrical about a vertical axis, a plurality of load lines evenly circumferentially distributed extending downwardly below the body to a load for providing uniform support forces thereto, an inflation opening provided in the body for inflating the body with a lifting gas, a heater for supplying a flow of lifting gas to the balloon body through said inflation opening during flight, a laterally extending inflatable tapering section secured along its base to one side of said body, means for inflating said tapering section, and a tow line connection secured to said body wall on a leading side thereof opposite said inflatable tapering section for towing the balloon laterally in a direction with the tapering section on the trailing side of the balloon, said tow line holding the wall out and preventing it from collapsing with air resistance.

4. A balloon structure comprising in combination an inflatable balloon body having a wall of a general teardrop shape symmetrical about a vertical axis, a plurality of load lines evenly circumferentially distributed extending downwardly below the body to a load for providing uniform support forces thereto, an inflation opening provided in the body for inflating the body with a lifting gas, a heater for supplying a flow of lifting gas to the balloon body through said inflation opening during flight, a laterally extending inflatable tapering section secured along its base to one side of said body, means for attachment of tow lines to the body for towing the body in a leading direction, and reinforcing means within said body holding the leading wall of the balloon body opposite said tapering section against collapse from air resistance forces with lateral movement as the balloon is towed.

5. A balloon structure comprising in combination an inflatable balloon body having a wall of a general teardrop shape symmetrical about a vertical axis, a plurality of load lines evenly circumferentially distributed extending downwardly below the body to a load for providing uniform support forces thereto, an inflation opening provided in the body for inflating the body with a lifting gas, a heater for supplying a flow of lifting gas to the balloon body through said inflation opening during flight, a laterally extending inflatable tapering section secured along its base to one side of said body, tow line connections secured to said body for towing the balloon laterally in a direction with the tapering section on the trailing side of the balloon, and reinforcing means extending horizontally across the body connected at its ends to the body wall with one end connected to a trailing side of the balloon facing said tapering section and the other end connected to a leading side opposite the tapering section for resisting inward deflection of the forward wall of the balloon body as it is towed.

References Cited in the file of this patent

UNITED STATES PATENTS

| | | |
|---|---|---|
| 1,332,107 | Coates | Feb. 24, 1920 |
| 1,364,596 | Wales | Jan. 4, 1921 |
| 1,629,374 | Avorio | May 17, 1927 |
| 3,017,138 | Flint | Jan. 16, 1962 |

FOREIGN PATENTS

| | | |
|---|---|---|
| 17,383 | Great Britain | Aug. 7, 1902 |
| 133,348 | Great Britain | Oct. 16, 1919 |